UNITED STATES PATENT OFFICE.

GADIENT ENGI, OF BASEL, SWITZERLAND, ASSIGNOR TO THE FIRM OF SOCIETY OF CHEMICAL INDUSTRY IN BASLE, OF BASEL, SWITZERLAND.

MIXED CHLOROBROMO DERIVATIVES OF INDIGO AND PROCESS OF MAKING SAME.

No. 872,115.     Specification of Letters Patent.     Patented Nov. 26, 1907.

Application filed June 14, 1907. Serial No. 378,930.

*To all whom it may concern:*

Be it known that I, GADIENT ENGI, chemist and doctor of philosophy, a citizen of the Swiss Republic, and resident of Basel, Switzerland, have invented new and useful Mixed Chlorobromo Derivatives of Indigo and a Process for the Manufacture of the Same, of which the following is a full, clear, and exact specification.

In my applications for United States Letters Patent Ser. No. 364019 and No. 364020 dated March 23d 1907, I have described a process for the manufacture of tri- and tetrabromo- derivatives of indigo consisting in treating indigo, or mono- or dibromindigo at a raised temperature with bromin in presence of a suitable indifferent diluent or solvent.

I have now found that in an analogous manner mixed chlorobromo derivatives of indigo can be obtained by brominating the known mono- and dichloro derivatives of indigo, whereby according to the chosen starting material and to the quantity of bromin employed monochlorodibromindigo, monochlorotribromindigo, dichloromonobromindigo or dichlorodibromindigo is obtained. Relatively to their chemical and tinctorial behavior these new chlorobromo derivatives of indigo show a great resemblance with the tribromo- and tetrabromo derivatives of indigo described in the said applications for Letters Patent No. 364019 and No. 364020. By treatment with alkaline reducing agents, the new mixed chlorobromo derivatives of indigo yield a vat wherein unmordanted cotton is dyed bright violet to blue tints of excellent fastness. The manufacture of these new chlorobromo derivatives of indigo is illustrated by the following examples.

Example I. 10 parts of monochlorindigo are suspended in 100 parts of nitrobenzene and mixed with 11 parts (about 4 atomic proportions) of bromin, and the whole is heated, in the course of about $1\frac{1}{2}$ hours, in a reflux apparatus, in an oil bath, to a temperature of 226° C. this being the temperature of the bath. The temperature is maintained at 226–228° C. for about $1\frac{1}{2}$ hours, during which time much hydrogen bromid is evolved. After cooling and filtering, the solid matter is washed with alcohol and dried. A mixed chlorobromo-derivative of indigo is thus obtained, with very good yield, as a crystalline blue powder having a composition corresponding with that of a dibrommonochlorindigo, $C_{16}H_7O_2N_2ClBr_2$. This compound dissolves in concentrated sulfuric acid to a blue solution tending slightly to green; addition of water to solution precipitates the dyestuff as blue flocks. Fuming sulfuric acid dissolves to a pure blue solution. Nitrobenzene and anilin dissolve it with difficulty when cold, but comparatively easily when hot, to a pure blue solution. When treated with the usual alkaline reducing agents in a vat, particularly with caustic soda (soda lye) and sodium hydrosulfite, the dyestuff yields a clear yellow liquor dyeing cotton bright blue tints which may be further increased in brightness by a short soaping at 90° C., such as by a bath containing 5 grams of soap and 5 grams of sodium carbonate per liter. The soaped dyeings are distinguished by an extraordinary fastness to washing, to chlorin and to light.

Example II. 10 parts of monochlorindigo are suspended in 100 parts of nitrobenzene and mixed with 17.5—22 parts of bromin (the theoretical quantity for 6 atomic proportions is 16.3 parts), the remainder of the treatment being like that of the preceding example. After cooling and filtering, the solid matter is washed with alcohol and dried, there being thus obtained a good yield of a tribromomonochlorindigo, $C_{16}H_6O_2N_2ClBr_3$, in the form of small brown-violet crystals having a bronze reflex. It dissolves in concentrated sulfuric acid to a blue solution tending slightly to green and in fuming sulfuric acid to a pure blue solution which does not change even when slightly heated. Anilin dissolves it with difficulty when cold to a green-blue solution and comparatively easily when hot to a pure blue solution; nitrobenzene dissolves it with difficulty when cold to a pure blue solution, and comparatively easily when hot to a violet blue solution. In respect of tinctorial properties monochlorotribromindigo presents great analogy to the tetrabromindigo. The bright blue dyeings which the dyestuff yields in an alkaline vat also become more brilliant when subjected to a short soaping, and are distinguished by an excellent fastness to washing, chlorin and light. In analogous manner the dichloro derivatives of indigo may be brominated, such as for example the ortho-, meta- or paradichlorindigo. According to the proportion of bromin used, namely 2 or 4 atomic proportions, the corresponding dichloromonobromo- or dichlorodibromo derivatives of indigo are obtained.

Example III. 5 parts of paradichlorindigo prepared from orthonitroparachlorobenzaldehyde or 4-chloro-2-phenyl-glycin-1-carboxylic acid, are well mixed with 50 parts of nitrobenzene and 5 parts of bromin (about 4 atomic proportions) and the mixture is heated in a reflux apparatus in an oil bath in such a manner that the temperature of the latter rises to 225° C. in the course of about an hour. Boiling is maintained for about 1½–2 hours, the mass is allowed to cool and the solid product separated by filtration. After washing with alcohol and drying the dichlorobromo derivative forms a blue-violet crystalline powder which dissolves in concentrated sulfuric acid to a red-brown solution; on diluting the solution blue-violet flocks are precipitated. Fuming sulfuric acid dissolves the dyestuff to a red-violet solution which passes in the course of time or on heating, to a blue-violet and finally to blue. In hot nitrobenzene the dyestuff dissolves to a violet solution. By treating the dyestuff in a vat with alkaline reducing agents, a clear yellow liquor is obtained which dyes cotton without a mordant bright violet tints, fast to washing and to chlorin.

If in this example, about 2.5 parts of bromin are employed, a dichloromonobromindigo of similar properties is obtained. Relatively to the dichloromonobrom- and dichlorodibromo- derivatives obtained by brominating ortho- or meta-dichlorindigo, it shall be noticed that they dye unmordanted cotton from an alkaline vat blue tints fast to washing, light and chlorin.

What I claim is:

1. The described process for the manufacture of mixed dchlorobromo derivatives of indigo, which process consists in treating mono- and dichlorindigo with bromin in the presence of a suitable indifferent medium.

2. The described process for the manufacture of mixed chlorobromo derivatives of indigo, which process consists in treating mono- and dichlorindigo with bromin in presence of nitrobenzene.

3. As new products the mixed chlorobromo derivatives of indigo which are obtained by treating mono- and dichlorindigo with bromin, constituting in dry state from blue to violet powders, insoluble in water, difficultly soluble in cold anilin and cold nitrobenzene, more easily in hot anilin and hot nitrobenzene with a blue to violet color, dissolving in fuming sulfuric acid with blue to violet color, yielding yellowish vats by treatment with suitable reducing agents, from which vats unmordanted cotton is dyed in beautiful violet to blue shades, fast to washing, light and chlorin.

In witness whereof I have hereunto signed my name this 4 day of June, 1907, in the presence of two subscribing witnesses.

GADIENT ENGI.

Witnesses:
  GEO. GIFFORD,
  AMAND RITTER.